United States Patent [19]
Gonsalves et al.

[11] Patent Number: 5,384,146
[45] Date of Patent: Jan. 24, 1995

[54] FROZEN WHIPPED TOPPINGS

[75] Inventors: Alexander A. Gonsalves, Libertyville; Gerard J. Hogan, Mount Prospect, both of Ill.

[73] Assignee: Kraft General Foods, Inc., Northfield, Ill.

[21] Appl. No.: 114,885

[22] Filed: Aug. 31, 1993

[51] Int. Cl.$^6$ .............................................. A23G 9/00
[52] U.S. Cl. .................................... 426/565; 426/570
[58] Field of Search ............... 426/570, 565, 566, 567

[56] References Cited

U.S. PATENT DOCUMENTS

| | | | |
|---|---|---|---|
| 3,350,209 | 10/1967 | Rodgers | 426/376 |
| 3,353,965 | 11/1967 | Patterson | 426/570 |
| 3,431,117 | 3/1969 | Lorant | 426/565 |
| 3,889,001 | 6/1975 | Buide et al. | 426/565 |
| 3,968,267 | 7/1976 | Ogasa et al. | 426/570 |
| 4,251,560 | 2/1981 | Dell et al. | 426/565 |
| 4,411,926 | 10/1983 | Trumbetas et al. | 426/565 |
| 4,451,492 | 5/1984 | Dell et al. | 426/564 |
| 4,478,867 | 10/1984 | Zobel et al. | 426/570 |
| 4,505,943 | 3/1985 | Dell et al. | 426/565 |
| 4,578,276 | 3/1986 | Morley | 426/565 |
| 5,077,076 | 12/1991 | Gonsalves | 426/565 |

OTHER PUBLICATIONS

Condensed Chemical Dictionary 8th ed., Van Nosbrand Reinhold Co. N.Y., 1971 p. 804.
Winter, Ruth, A Consumer's Dictionary of Food Additives, Crown Pub., N.Y. 1972 p. 204.
FMC Technical Bulletin, "Sodium Ployphosphates, Glassy Sodium Hexametaphosphate", Jan. 1988.
La Creme ® Whipped Topping with Real Cream ingredient line (Pet Incorporated).

Primary Examiner—Jeanette Hunter
Attorney, Agent, or Firm—Thomas R. Savoie; Thomas A. Marcoux

[57] ABSTRACT

Frozen whipped topping formulations containing milk solids and glassy sodium polyphosphates having an average chain length of at least n=18 to n=50.

6 Claims, No Drawings

FROZEN WHIPPED TOPPINGS

BACKGROUND OF THE INVENTION

1. Field of the Invention

This invention relates to a milk-solids containing, frozen whipped topping formulations which will process in a consistent manner, are freeze-thaw stable and will retain a stable foam structure and texture after twenty-one days of refrigerator (40° F.) storage.

2. Description of the Prior Art

Compositions and processes for preparing either dairy or non-dairy frozen whipped toppings are known in the art. U.S. Pat. Nos. 3,431,717 to Lorant, 4,411,926 to Trumbetas et al., 4,251,560, 4,451,452 and 4,505,943 to Dell et al., and 4,478,867 to Zobel et al. relate to such compositions and processes. The disclosures of these patents enable the production of freeze-thaw stable, frozen whipped toppings which are distributed as frozen products, which are thawed prior to use, and which can be stored in the refrigerator for up to 21 days without textural breakdown. The aforementioned prior art patents related to frozen whipped toppings wherein the fat content is about 20% or more. U.S. Pat. No. 5,077,076 to Gonsalves et al. has disclosed milk solids and phosphate salt-containing formulations and processes which have enabled the production of comparably stable, frozen whipped topping having a fat content reduced to 15% or below.

It has been found, however, that the processability of the low-fat formulations of the Gonsalves et al. patent is impacted by the natural and/or seasonal variability in the composition of milk solids contained in the formulation. This results in cold emulsion viscosities varying over a wide range, such as from 500 to 5000 centipoises. This variability in viscosity makes it difficult to maintain steady-state production. Typically, it is necessary to have to adjust production flow rates to account for the changing state of the emulsions being processed. It has also been found that the processability of full-fat (e.g., 20 to 30% fat by weight) frozen whipped topping formulations containing milk solids and phosphate salts, as disclosed in aforementioned U.S. Pat. No. 4,451,492, will also vary with the composition of milk solids.

DESCRIPTION OF THE INVENTION

This invention enables the production of milk solids-containing frozen whipped toppings which will process consistently in commercial production and which will provide consistent product quality. According to this invention the phosphate salts which are included in the milk solids-containing, frozen, whipped, topping formulations are glassy sodium polyphosphates.

As described and exemplified in the aforementioned U.S. Pat. Nos. 4,451,492 and 5,077,076, phosphate salts have been included in the formulations of milk solids-containing, frozen, whipped toppings. These phosphate salts are believed to chelate divalent metal ions, such as calcium, and to also assist in reducing the effects of calcium on protein solubility and protein interactions. The phosphate salts which have been disclosed in the patent literature and used commercially in the formulation of milk solids-containing frozen whipped toppings are disodium phosphate and/or tetrasodium pyrophosphate.

It has now been found that the use of glassy sodium polyphosphates in place of the conventional disodium and tetrasodium polyphosphates overcome the problems encountered with the prior art frozen whipped topping formulations. The glassy sodium polyphosphates which are used in this invention may be represented by the formula $(NaPO_3)_n \cdot Na_2O$, where n, the average chain length, is at least about 13 and preferably at least 18. Suitable materials are commercially-available and are exemplified by the glassy sodium polyphosphates available from FMC Corporation (Philadelphia, PA) under the trademarks Hexaphos® (n=13) and Glass H® (n=21). The glassy sodium polyphosphate known as Maddrell's Salt where "n" is about 100 has also been found to be useful in this invention, but is not as effective as lower (e.g., n=21) chain lengths. The average chain length of the glassy sodium polyphosphate should, therefore, be less than about n=100, preferably less than about n=50. The optimum average chain length is estimated to be about n=18 to about n=50. Suitable levels for the glassy sodium polyphosphates in the formulations of this invention are 0.01 to 0.1%, preferably 0.02 to 0.06%. These glassy sodium polyphosphates are believed to greatly reduce protein interactions, as compared to smaller molecular weight phosphates, such as disodium phosphate and tetrasodium pyrophosphate, due their high molecular weight and long polymeric chain length which appear to provide steric barriers that interfere with protein interactions.

All ratios and percents (except overrun) used in the description of this invention are by weight.

The frozen whipped toppings of this invention will have a total solids level of about 38 to 60%, including a fat level of about 8 to 30%, and an overrun in excess of 250, preferably about 300.

Hydrocolloid stabilizing agents, such as polysaccharide gums, are also required in the formulations of this invention at a level of from 0.05 to 1%, preferably 0.1 to 0.3%. These stabilizers are also believed to assist in providing structure to the foam, improving the mouthfeel of the product and preventing syneresis. Vegetable or synthetic gums such as carrageenan, xanthan, guar, locust bean, alginate and the like, or carboxymethylcellulose, methylcellulose ether and the like, and mixtures thereof should be useful in this invention. A combination of xanthan gum and a galactomannan gum, such as locust bean gum and/or guar gum, at a ratio of between about 0.5-2 to 1 has proven to be useful in this invention.

The fats used in the formulation of this invention are preferably the vegetable fats or oils commonly employed in frozen whipped toppings. Such fats or oils may be fully or partially hydrogenated. Hydrogenated oils, such as coconut and palm kernel oil, have typically been used in the production of frozen whipped toppings. Animal fats, such as milk fat, would be functional in the formulation of this invention, but the use of animal fats would typically be avoided in the production of non-dairy formulations. Partially hydrogenated vegetable oils such as cottonseed, peanut, olive, corn, soy or the like could be useful for use in this invention.

Among the emulsifying agents which are used in the formulations in this invention are: the monoglycerides of fatty acids, such as monostearin; polyoxyalkylene ethers of fatty esters of polyhydric alcohols, such as the polyoxyethylene ethers of sorbitan monostearate (i.e., polysorbate 60); fatty esters of polyhydric alcohols, such as sorbitan monostearate; esters of glycol and fatty acids, such as propylene glycol monostearate; partial esters of carboxylic acids with glycerides of fatty acids, such as glyceryl lactopalmitate; and polyglycerol esters of fatty acids. Preferably a combination of emulsifying agents is employed; polysorbate 60 and sorbitan monostearate at about a 2–3:1 ratio has proven to be useful in this invention.

Water-soluble carbohydrates are employed in the formulation at a level of from 20 to 36% to supply solids and sweetness. Mono and disaccharides (e.g., dextrose, sucrose, fructose) may be included in the formulation to provide the desired sweetness. The formulations of this invention preferably include tri- or higher saccharides which serve as an economical source of solids which are important for the stability of the product. Specifically, at least 25%, preferably at least 30%, of the total saccharides are tri- or tri- and higher saccharides. Typically, these higher saccharides will be added in the form of sugar syrups; however, the addition of maltodextrins or other hydrolyzed starch solids would be possible.

The protein component which is present in the formulations of this invention will be a combination of milk proteins and sodium caseinate. Non-fat milk solids (36% protein) will be a typical source of milk protein; however, fluid milk or cream could also be used. The protein level in the formulation will typically be about 0.5 to 3.5%. Milk proteins will typically be at a level of about 0.2 to 2% with the level of sodium caseinate being be from 0.3 to 3%.

Various flavors, colors or nutritional ingredients may be added in minor amounts in order to produce a commercially-acceptable product.

The frozen whipped topping of this invention may be prepared generally in accordance with the process set forth in U.S. Pat. Nos. 4,451,492 to Dell et al., 4,478,867 to Zobel et al. and 5,077,076 to Gonsalves et al., all of which are hereby incorporated by reference. Accordingly, the ingredients are batched and the formulation is pasteurized and homogenized at a pressure of at least 6,000 psi. The homogenized and pasteurized mixture is cooled to about 30° F. (−1.1°C.) and then held for at least 45 minutes in order to permit the fat to crystalize, and apparently to allow for a rearrangement of protein and emulsifying agents. The resulting emulsion is then aerated in a continuous mixer having a mixing pressure of from about 45 to 100 psig and a mixing temperature of from about 40° F. (4.4° C.) to about 55° F. (12.80° C.).

The emulsion is aerated by incorporating air or an inert gas such as nitrogen or carbon dioxide in an amount sufficient to produce an overrun in the final product of from 250 to 350%, preferably about 300%. The pressure of the aerated emulsion is then reduced by about 10 to 60 psig in a continuous and gradual manner by conventional means, such as conveying the emulsion through one or more tubes or pipes having a diameter and length sufficient to effect the desired pressure reduction. Preferably this pressure reduction step occurs over a period of at least 5 seconds in order to permit equilibration of air cells.

The pressure-reduced emulsion is then whipped. Whipping may be done in an open mixer, such as a Hobart ® mixer, but preferably is done in a closed vessel, such as a jacketed, scraped-surface heat exchanger. According to a preferred embodiment, whipping is done at a pressure of about 20 to about 70 psig and a temperature of about 40° F. (4.40° C.) to about 60° F. (15.6° C.). The closed vessel may, in fact, be comprised of a plurality of connected heat exchangers in order to better control the temperature and pressure of the emulsion during whipping. As noted in the Zobel et al. patent the amount of shear employed during the whipping step is controlled in order to produce a product with the desired texture.

After the product has been whipped to the desired extent, the pressure is then reduced to atmospheric pressure in a gradual and continuous manner. This pressure reduction may also be effected by means of a length of pipe or tubing having the appropriate diameter and length. Upon reaching atmospheric pressure, the temperature of the whipped emulsion should be from about 50° F. (10.0° C.) to about 60° F. (15.6° C.). In typical plant operation the whipped emulsion is passed to a filler, packaged in containers for retail sale and frozen at 0° F. (−17.8° C.) or below.

The following example further illustrates various features of this invention but is not intended to in any way limit the scope of the invention, which is defined in the appended claims.

EXAMPLE 1

A low-fat frozen whipped topping is produced with the following formulation:

| Ingredient | Weight % |
| --- | --- |
| Water | 54.16 |
| Hydrogenated Coconut/Palm Kernel Oil | 12.85 |
| Corn Syrup (42DE, 80% solids) | 17.90 |
| High Fructose Corn Syrup (42% conversion, 71% solids) | 5.50 |
| Sucrose | 5.35 |
| Non-Fat Milk Solids | 2.70 |
| Sodium Caseinate | 0.70 |
| Emulsifying Agents | 0.26 |
| Vegetable Gums | 0.17 |
| Flavors & Colors | 0.38 |
| Glassy Sodium Polyphosphate (n=21) | 0.03 |

The formulation was processed in accordance with the Example of the aforementioned Gonsalves et al. patent which is hereby incorporated by reference. The product, which had a caloric density of about 37 calories per 60 ml serving, was judged to be freeze-thaw stable and the thawed product was judged to have high-quality flavor, texture and overrun, comparable to Non-Diary Cool Whip ® Frozen Whipped Topping, even after 21 days of refrigerator storage (40° F./4.4° C.). As compared to the formulation of the Gonsalves et al. patent, the formulation of this Example overcomes the problems previously noted in that a much more consistent cold emulsion viscosity (i.e., typically only varying between 250 and 500 centipoises) during plant processing. This enables consistent, steady-state conditions, easier air incorporation and whipping and permits optimization of the process for higher throughput and consistent quality.

EXAMPLE 2

A full-fat, frozen whipped topping is produced with the following formulation:

| Ingredient | Weight |
| --- | --- |
| Water | 45.43 |
| Hydrogenated Coconut/Palm Kernel Oil | 20.82 |
| Corn Syrup (43DE, 80% solids) | 13.09 |
| Sucrose | 8.05 |
| HFCS (42% conversion, 71% solids) | 5.5 |

-continued

| Ingredient | Weight |
| --- | --- |
| Heavy Cream | 2.7 |
| NFDMS | 1.9 |
| Sodium Caseinate | 1.5 |
| Chemical Emulsifiers | 0.48 |
| Flavors & Colors | 0.38 |
| Vegetable Gums | 0.13 |
| Glassy Sodium Polyphosphate (n=21) | 0.02 |

The formulation was processed in accordance with Example 1 of the aforementioned Zobel et al. patent which is hereby incorporated by reference. The target overrun for this product was however 265% and the hold temperature was about 43° F/6.1° C. The formulation was found to maintain consistent cold emulsion viscosity enabling the process to be optimized for increased throughputs.

Having thus described the invention, what is claimed is:

1. In a milk solids-containing, frozen whipped topping formulation having an overrun in excess of 250%, a solids level of about 38 to 60%, including fat, water-soluble carbohydrates, hydrocolloid stabilizing agents, emulsifying agents and sodium caseinate the improvement being the presence of glassy sodium polyphosphates having an average chain length of $n=18$ to about $n=50$ at a level of 0.01 to 0.1%.

2. The frozen whipped topping formulation of claim 1 wherein the level of glassy sodium polyphosphate is from 0.02 to 0.06%.

3. The frozen whipped topping formulation of claim 1 wherein the average chain length of the glassy sodium polyphosphate is about $n=18$ to about $n=40$.

4. The frozen whipped topping formulation of claim 1 wherein the average chain length of the glassy sodium polyphosphate is $n=18$ to about $n=21$.

5. The frozen whipped topping formulation of claim 1 the fat content is less than 15% by weight.

6. The frozen whipped topping formulation of claim 1 wherein the fat content is at least about 20%.

* * * * *